United States Patent
Lee et al.

(10) Patent No.: US 7,594,750 B2
(45) Date of Patent: Sep. 29, 2009

(54) METHOD FOR OUTPUTTING INTERNAL TEMPERATURE DATA IN SEMICONDUCTOR MEMORY DEVICE AND CIRCUIT OF OUTPUTTING INTERNAL TEMPERATURE DATE THEREBY

(75) Inventors: Seung-Hoon Lee, Gyeonggi-do (KR); Chul-Woo Park, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 14 days.

(21) Appl. No.: 11/335,036

(22) Filed: Jan. 18, 2006

(65) Prior Publication Data

US 2006/0159156 A1   Jul. 20, 2006

(30) Foreign Application Priority Data

Jan. 20, 2005   (KR) .................. 10-2005-0005277

(51) Int. Cl.
*G01K 7/00* (2006.01)
*G11C 7/00* (2006.01)

(52) U.S. Cl. ............... 374/178; 374/141; 374/170; 702/130; 327/513; 365/222

(58) Field of Classification Search ............ 374/141, 374/170–172, 178, 183, 185, 163; 702/130–136; 327/512–513; 365/222, 212, 189.09; 326/32; 324/224

See application file for complete search history.

(56) References Cited

U.S. PATENT DOCUMENTS

| 5,159,520 | A | * | 10/1992 | Toyooka et al. | ............. | 361/103 |
|---|---|---|---|---|---|---|
| 5,296,777 | A | * | 3/1994 | Mine et al. | ............. | 310/334 |
| 5,796,290 | A | * | 8/1998 | Takahashi | ............. | 327/512 |
| 6,631,503 | B2 | | 10/2003 | Hsu et al. | | |
| 6,756,856 | B2 | * | 6/2004 | Song et al. | ............. | 331/176 |
| 6,768,693 | B2 | * | 7/2004 | Feurle et al. | ............. | 365/222 |
| 7,003,273 | B1 | * | 2/2006 | Shimanuki et al. | ............. | 455/255 |
| 7,035,157 | B2 | * | 4/2006 | Chang | ............. | 365/222 |
| 7,167,401 | B2 | * | 1/2007 | Stave | ............. | 365/194 |
| 7,295,484 | B2 | * | 11/2007 | Cruz et al. | ............. | 365/222 |
| 7,322,743 | B2 | * | 1/2008 | Gozloo et al. | ............. | 374/170 |
| 7,453,302 | B2 | * | 11/2008 | Le et al. | ............. | 327/262 |
| 7,492,657 | B2 | * | 2/2009 | Sako | ............. | 365/222 |
| 2002/0080673 | A1 | | 6/2002 | Benedix et al. | | |
| 2002/0167296 | A1 | * | 11/2002 | Nagata et al. | ............. | 320/155 |
| 2003/0056057 | A1 | | 3/2003 | Lawrence | | |
| 2003/0058016 | A1 | * | 3/2003 | Mizugaki | ............. | 327/200 |
| 2003/0086476 | A1 | * | 5/2003 | Mizuta | ............. | 374/178 |

(Continued)

FOREIGN PATENT DOCUMENTS

JP   2003132450 A   *   5/2003

*Primary Examiner*—Gail Verbitsky
(74) *Attorney, Agent, or Firm*—Marger Johnson & McCollom, P.C.

(57) ABSTRACT

A method for outputting internal temperature data in a semiconductor memory device can output, at high speed, relatively accurate temperature data externally, without continuously or periodically driving a temperature sensor. The method for outputting the internal temperature data comprises externally outputting internal temperature data stored in a register in a preceding driving cycle in response to a temperature data request signal; driving a temperature sensor during a predefined time section after the output of the internal temperature data is completed; and storing the internal temperature data obtained from the temperature sensor in the register. Power consumption is reduced and accurate temperature data is output externally within a shorter time.

11 Claims, 6 Drawing Sheets

U.S. PATENT DOCUMENTS

| | | |
|---|---|---|
| 2005/0146965 A1 | 7/2005 | Kim et al. |
| 2006/0044910 A1* | 3/2006 | Chang .................. 365/222 |
| 2006/0077742 A1* | 4/2006 | Shim et al. ............ 365/222 |
| 2006/0203589 A1* | 9/2006 | Lee ....................... 365/222 |
| 2007/0121408 A1* | 5/2007 | Yang et al. ............ 365/222 |
| 2007/0274147 A1* | 11/2007 | Egerer .................. 365/222 |
| 2007/0297260 A1* | 12/2007 | Lee et al. .............. 365/222 |
| 2008/0159038 A1* | 7/2008 | Jeong et al. ........... 365/222 |
| 2008/0180300 A1* | 7/2008 | Jeong et al. ........... 341/166 |
| 2008/0205183 A1* | 8/2008 | Hwang et al. ......... 365/222 |
| 2008/0247256 A1* | 10/2008 | Kim ....................... 365/222 |

* cited by examiner

METHOD FOR OUTPUTTING INTERNAL TEMPERATURE DATA IN SEMICONDUCTOR MEMORY DEVICE AND CIRCUIT OF OUTPUTTING INTERNAL TEMPERATURE DATE THEREBY

CROSS-REFERENCE TO RELATED APPLICATION

This application claims the benefit of Korean Patent Application No. 10-2005-0005277, filed Jan. 20, 2005, the disclosure of which is hereby incorporated herein by reference in its entirety.

BACKGROUND OF THE INVENTION

1. Technical Field

The present invention relates to temperature sensing to be applied in a semiconductor memory device, and more particularly, to a method for outputting internal temperature data in a volatile semiconductor memory device such as Dynamic Random Access Memory (DRAM) and a circuit for outputting the internal temperature data thereby.

2. Discussion of Related Art

Generally, for high-efficiency electronic systems such as personal computers or electronic communication machinery, volatile semiconductor memory devices such as DRAM onboard as memory have become faster and more highly integrated. In case of semiconductor memory devices onboard in battery-operated systems such as mobile phones or laptop computers, the low power consumption characteristics are critically required. Therefore, semiconductor manufacturers have continuously worked to reduce the operating current and standby current in order to provide a mobile oriented low power solution.

The data retention characteristics of the memory cell in the DRAM comprising one transistor and one storage capacitor are very sensitive to temperature. Thus, if the memory cell can be controlled suitably according to its temperature characteristics, this can be useful in saving power. An approach to realize such power saving by installing a temperature sensor in the semiconductor memory device such as the DRAM and differentiating a refresh cycle according to the temperature of a chip is well known in this art.

Figure 1:
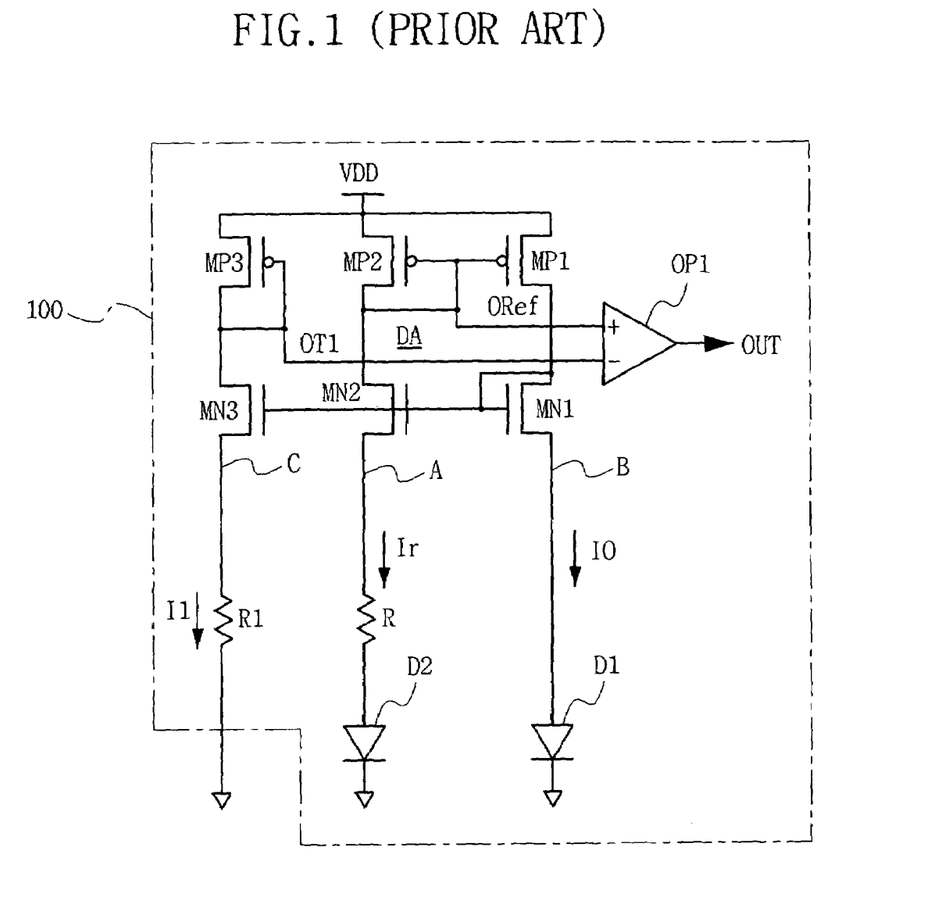
FIG. 1 illustrates a circuit configuration of a conventional temperature sensor.
Figure 2:
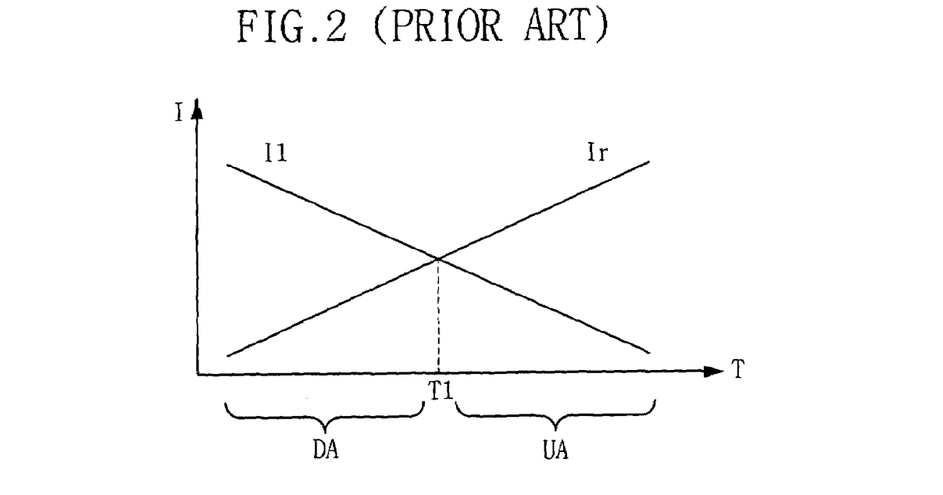
FIG. 2 is a graph showing output characteristics of the circuit of FIG. 1.

FIG. 1 illustrates a circuit 100 of a temperature sensor to be installed in a semiconductor memory device. The temperature sensor is a semiconductor temperature sensor of a band gap reference type basically comprising a current mirror-type differential amplifier and a diode, which is well known in this art. Currents flowing in branches C and A of the temperature sensor have temperature-current characteristics as shown in FIG. 2. In FIG. 2, the horizontal axis indicates temperature and the vertical axis indicates current. The characteristic graphs of the branches C and A intersect at trip point T1.

However, the temperature sensor as described above is very sensitive to a noise environment, and thus the deviation of the temperature data as output according to the operation modes of the semiconductor memory device may be great. Consequently, there are problems in that accuracy of the obtained temperature data is lowered and reliability of the temperature data is also lowered accordingly.

Figure 3:
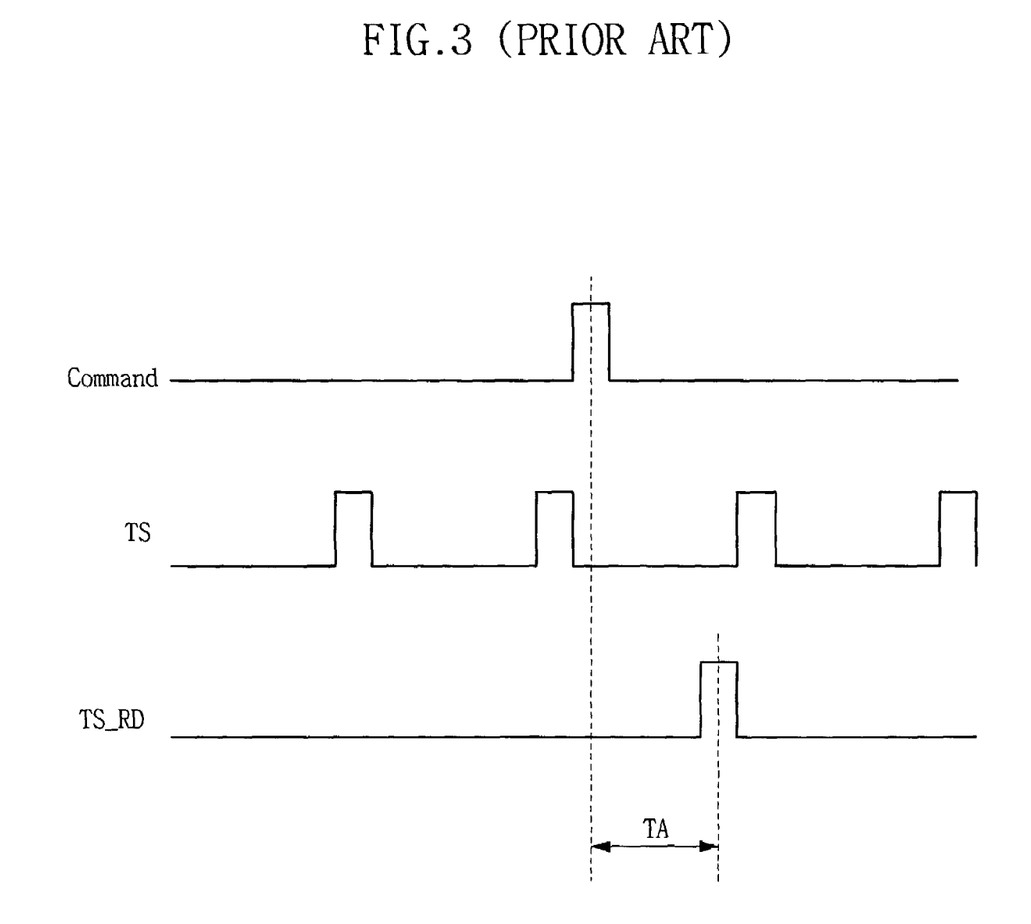
FIG. 3 illustrates temperature data output timing according to the conventional art.

In practice, an attempt has been made to transfer the temperature of the DRAM chip into a chip-set such as a CPU or memory controller so that the chip-set controls various operations of the DRAM, for example, a refreshing operation. In such a case, the temperature sensor is continuously or periodically activated to perform a temperature sensing operation. When an external command is applied like a waveform (Command) in FIG. 3 while the temperature sensor is periodically operating, internal temperature data is read-out in the DRAM until a transition of a waveform (TS-RD) occurs. FIG. 3 illustrates temperature data output timing according to the conventional art.

When the internal temperature data of the DRAM chip is obtained by the manner shown in FIG. 3, the temperature data obtained according to various operation modes of the DRAM may have differences. That is, if the external command is applied when the DRAM performs an operation of reading the data, it is difficult for the temperature sensor to sense the present temperature data in a sufficiently stable state, and it may output deviated temperature data due to the noise environment. Consequently, the reliability of the internal temperature data as obtained is lowered, and power consumption is increased since the temperature sensor is in the continuously or periodically operating state. Moreover, since an output access time of the temperature data is indicated as access section TA of FIG. 3, there is a problem in that the time for the chip-set to obtain the temperature data becomes somewhat long.

In order to obtain accurate temperature data, it is preferable to ensure that the environment is without any noise, during which the temperature sensor can perform the temperature sensing operation in a sufficiently stable state, for more than the time for responding to the sensing of the temperature sensor. Thus, measures to make it possible to obtain more reliable temperature data within a shorter time, without damaging/interrupting the performance of the semiconductor memory device, are required in the battery-operated systems.

SUMMARY OF THE INVENTION

Therefore, the present invention is directed to provide a semiconductor memory device to solve the aforementioned conventional problems.

One aspect of the present invention is a method for outputting internal temperature data in a semiconductor memory device which can provide a temperature sensor onboard in the semiconductor memory device with a stable operation environment, and a circuit for outputting the internal temperature data thereby.

Another aspect of the present invention is a method for outputting internal temperature data in a semiconductor memory device which can reliably obtain temperature data of a chip, without continuously or periodically operating a temperature sensor.

Another aspect of the present invention is a method for outputting internal temperature data in a semiconductor memory device which can output relatively accurate temperature data at high speed, without continuously or periodically operating a temperature sensor, and a circuit for outputting the internal temperature data thereby.

Another aspect of the present invention is a method for outputting temperature data so as to obtain more reliable temperature data within a shorter time, minimizing or reducing power consumed in a temperature sensor onboard in the DRAM.

In accordance with exemplary embodiments of some of the aforementioned aspects, a method for outputting internal temperature data comprises externally outputting the internal temperature data stored in a register during a preceding driving cycle in response to a temperature data request signal; driving a temperature sensor during a predefined time section after the output of the internal temperature data is completed, and storing, in the register, the internal temperature data obtained from the temperature sensor.

Preferably, the temperature data request signal may be an expansion mode register set (EMRS) command as provided in an external memory controller connected to the semiconductor memory device, and the temperature sensor may be a semiconductor temperature sensor of a band gap reference type.

Further, it may be suitable that the predefined time section is below about 5 microseconds, and the internal temperature data can be output by a data output buffer which is in an inactive state in a preceding data access operation mode.

According to the method for outputting the temperature data, power consumption can be reduced and relatively accurate temperature data can be externally output within a shorter time.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The foregoing and other objects, features and advantages of the present invention will be more apparent from the preferred embodiments described in detail hereinafter, with reference to the accompanying drawings. However, the invention should not be construed as limited to only the embodiments set forth herein. Rather, these embodiments are presented as teaching examples. It should be noted that in the drawings, the same or similar portions are indicated using the same or similar reference numbers for the convenience of explanation and understanding.

Figure 4:
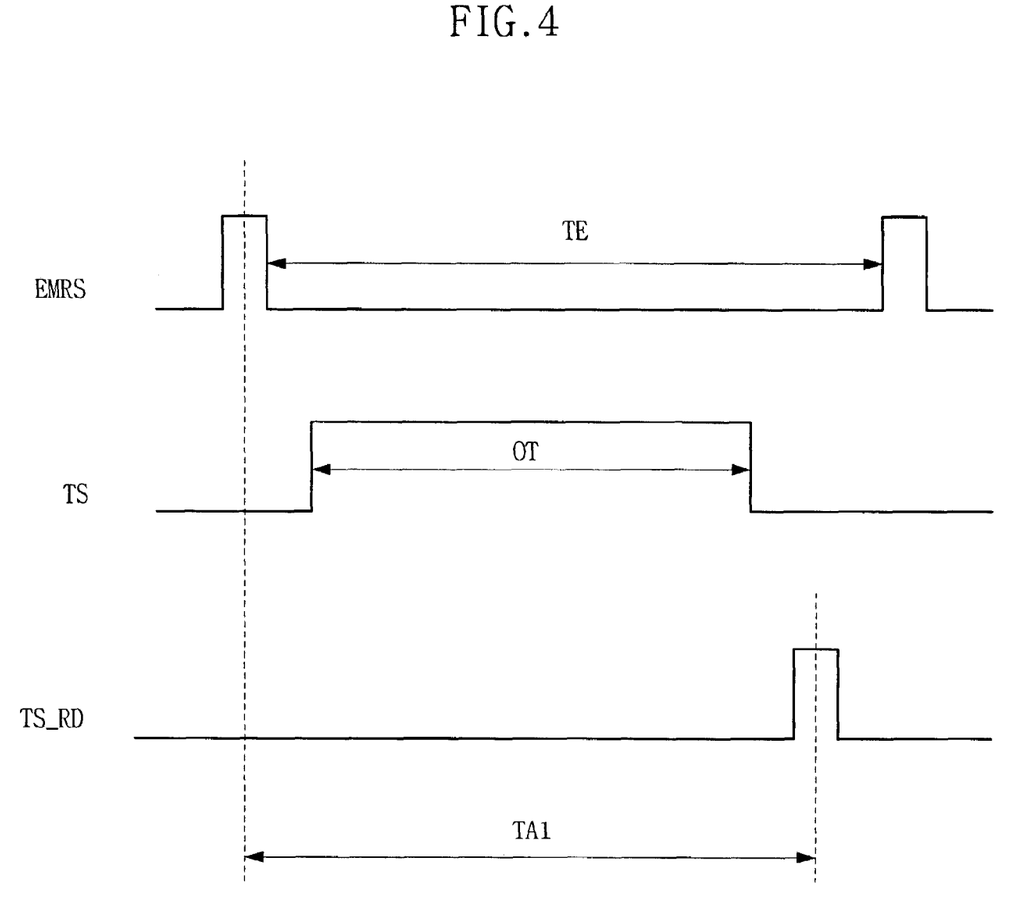
FIG. 4 illustrates temperature data output timing according to a first embodiment of the present invention.

FIG. 4 illustrates temperature data output timing according to a first embodiment of the present invention. FIG. 4 shows a timing relation in which internal temperature data of a semiconductor memory device is externally output when an external request signal, e.g., an expansion mode register set (EMRS) command, is applied while the semiconductor memory device is not in a data access mode and a temperature sensor is in an inactive state; that is, it is not continuously or periodically activated. In FIG. 4, a section TE of a waveform EMRS is an active section of the EMRS command, and a section OT of a sensor operation waveform TS is an operation section of sensing a temperature by the temperature sensor. Thus, the time for externally outputting the internal temperature data obtained from the temperature sensor is represented as an access section or interval TA1 of a waveform TS_RD.

Differently from the manner in FIG. 3, the method for outputting the internal temperature data according to the first embodiment has advantages of reducing power consumption and enabling the external output of the relatively accurate temperature data. However, it may be disadvantageous if this method is applied to a semiconductor memory device having a very high speed operation since the access time of the temperature data becomes relatively longer.

Figure 5:
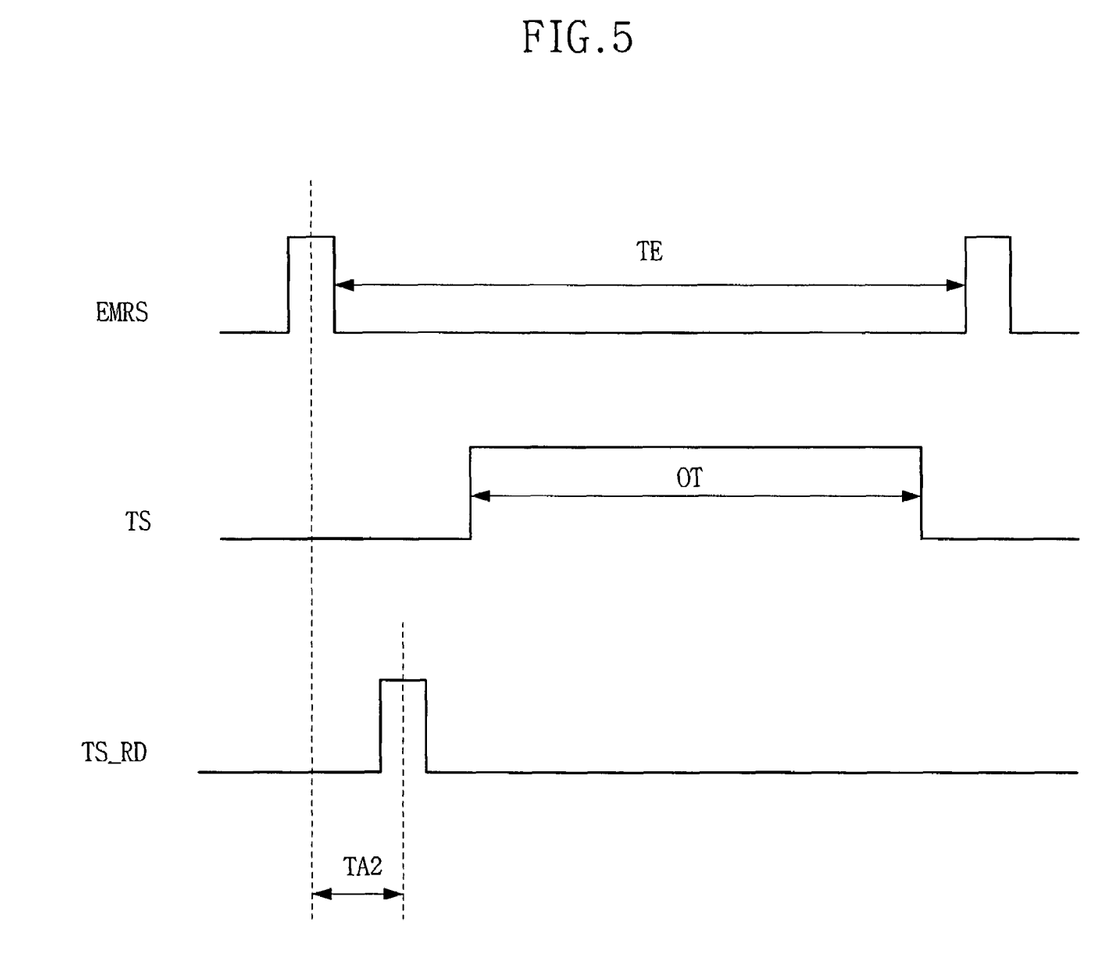
FIG. 5 illustrates temperature data output timing according to a second embodiment of the present invention.

Below is described a second embodiment which is able to greatly shorten the access time of the first embodiment, with reference to drawings. FIG. 5 illustrates temperature data output timing according to the second embodiment of the present invention. With reference to FIG. 5, it can be seen that the transition section of a waveform TS_RD is different from that of FIG. 4. As indicated by an access section TA2, the access time is shortened, compared to the case of the first embodiment. In the second embodiment, a method of outputting internal temperature data of a semiconductor memory device is preceded by the following steps. When a temperature data request signal is applied by a command of the EMRS, in response to this signal, the internal temperature data stored in a register during a preceding driving cycle is output externally. After the output of the internal temperature data is completed, a temperature sensor is driven during a predefined time section or interval OT. For example, during the time section OT as defined below about 5 microseconds, the internal temperature data obtained from the temperature sensor is stored in the register. In this case, if the internal temperature data is already stored in the register, this means that data is updated after a second storing operation. In general, it is known that a temperature of a memory chip changes less than 0.5° C. within 10 milliseconds, and thus there is no problem in the operating stability if the temperature sensor is operated at a random time within the time section below 10 milliseconds.

Figure 6:
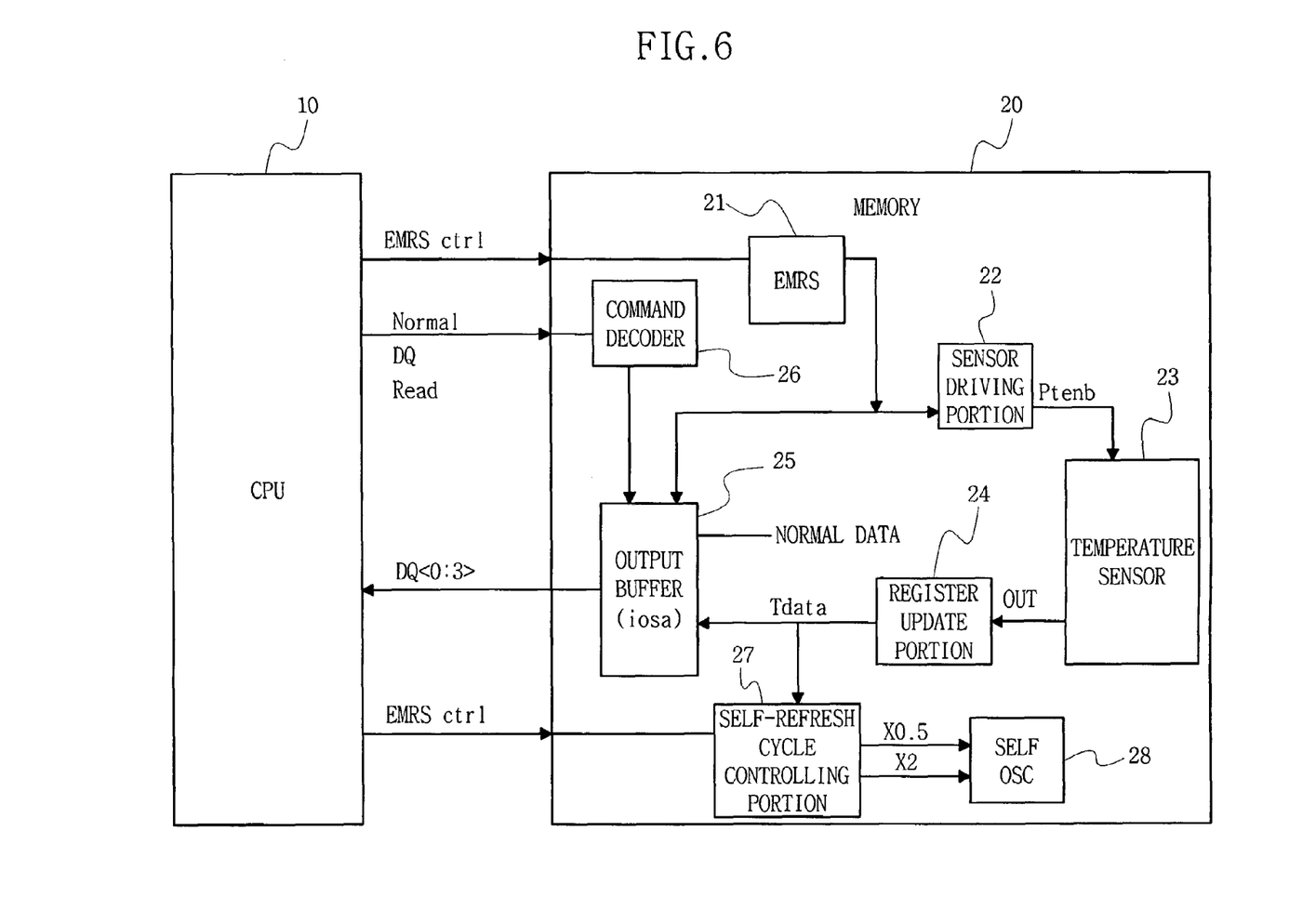
FIG. 6 is a block diagram of an exemplary circuit as applied to realize the embodiments of the present invention.
Figure 7:
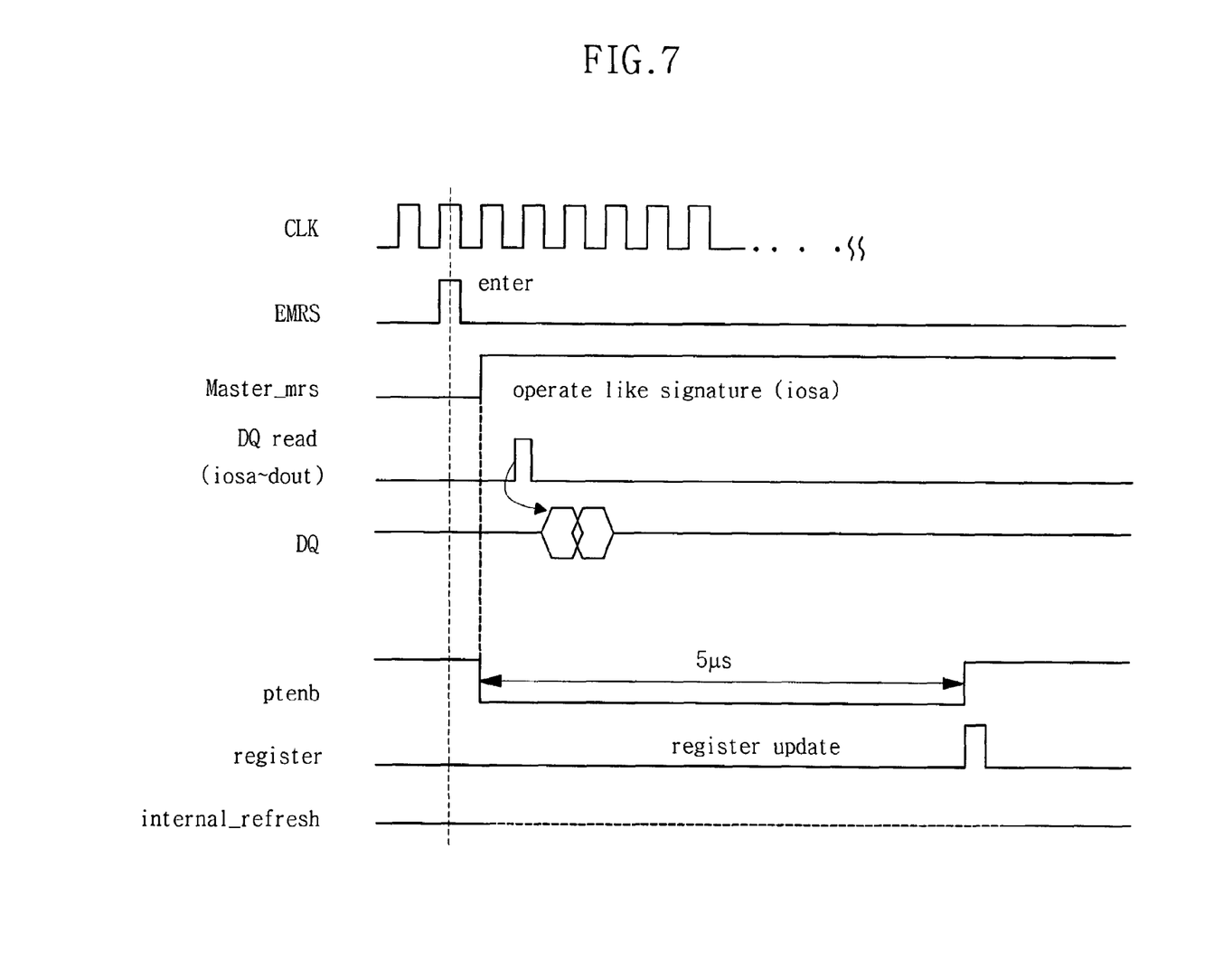
FIG. 7 illustrates the operation timing of FIG. 6.

FIG. 6 illustrates a block diagram of an exemplary circuit as applied to realize the embodiments of the present invention and FIG. 7 illustrates operation timing of FIG. 6.

FIG. 6 shows a semiconductor memory device 20 connected to a CPU 10 through various signal lines. A circuit for outputting internal temperature data in the semiconductor memory device 20 comprises a plurality of circuit blocks 21-28. A sensor driving portion 22 receives an external command signal as output by an EMRS 21 and generates a driving signal Ptenb. Herein, the duration of applying the external command signal by the EMRS 21 defines the state in which the semiconductor memory device 20 does not perform a data accessing operation. Thus, a sensing operation of the temperature sensor is stably ensured. The temperature sensor 23 senses an internal temperature of the device 20 only when the driving signal Ptenb is in a first state (e.g., at a low level), thereby generating the internal temperature data OUT. The internal temperature data as output from the temperature sensor 23 is stored in a register update portion 24 including a register. On the other hand, the operation of the temperature sensor 23 is in a stop state when the driving signal Ptenb is maintained in a second state (e.g., at a high level) by a transition of the external command signal. Ultimately, the driving signal Ptenb is switched to the second state by the external command signal; at this time, the external command signal becomes the command for temperature data read-out. After the stored and updated internal temperature data Tdata in the register is externally output by a data output buffer 25, the driving signal is transferred to the first state. Accordingly, the internal temperature data as output by the temperature sensor 23 is updated and stored in the register. Herein, it is preferable that the internal temperature data is output by the data output buffer 25 which is in an inactive state in a preceding data access operation mode. For this, a command decoder 26 and the block of EMRS 21 are provided. FIG. 7 shows the operation timing of the circuit of FIG. 6 as described above.

In the circuit of FIG. 6, a self-cycle controlling portion 27 and a self-oscillator 28 can be provided to control a self-refresh cycle. In addition, an example of the prior art, in which the refresh of semiconductor memory is controlled according to a temperature by applying the EMRS command, is disclosed in U.S. Patent Publication No. 2003/0056057 published Mar. 20, 2003 in the U.S.A., which will be referred to for the application of the EMRS command. In the embodiments, the external CPU connected to the memory device or the EMRS command provided in the memory controller serves as the example of the temperature data request signal. However, other logic signals can of course be utilized for different cases. Further, as the example of the temperature sensor, the semiconductor temperature sensor of the band gap reference type is mentioned but other temperature sensors are usable.

Consequently, the access time of the temperature data is reduced by reading-out the temperature data into the external output pin by the output buffer at the random time when the temperature sensor is in the OFF state, and the temperature data of the chip can be accurately output in the environment having almost no noise effect by activating the temperature sensor when the device is not performing any refreshing operation or a data-reading or writing operation.

As described above, according to the present invention, power consumption can be reduced and accurate temperature data can be externally output within shorter time. Therefore, the technique of the present invention has the advantage of being more suitably applied to the mobile oriented memory requiring the low power characteristics.

A person skilled in this art can understand that the concepts described herein may be applied to specific applicable examples in various ways. The specific configuration of the operation timing or circuits as described above indicates some of the embodiments of the present invention, and a more efficient method available to the circuit designers in the art may be possible. Thus, the specific realization thereof should belong to the present invention and be within the scope of the claims.

The present invention has been described using preferred exemplary embodiments. However, it is to be understood that the scope of the invention is not limited to the disclosed embodiments. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

What is claimed is:

1. A method for outputting internal temperature data of a semiconductor memory device, comprising:

driving a temperature sensor to an on state during a predefined time section in response to an external request signal as applied in case of a non-data access mode;

driving the temperature sensor to an off state during a data access mode; and externally outputting internal temperature data as obtained from the temperature sensor when the temperature sensor is in the off state.

2. The method according to claim 1, wherein the external request signal is an expansion mode register set (EMRS) command as provided in an external memory controller connected to the semiconductor memory device.

3. The method according to claim 1, wherein the temperature sensor is a semiconductor temperature sensor in a band gap reference type.

4. The method according to claim 1, wherein the predefined time section is below about 5 microseconds.

5. The method according to claim 1, wherein the internal temperature data is output by a data output buffer, the data output buffer being in an inactive state in a preceding data access operation mode.

6. The method according to claim 1, including storing the internal temperature data during the non-data access mode and externally outputting the stored internal temperature data during a data access operation mode.

7. A method for outputting internal temperature data of a semiconductor memory device, comprising:

externally outputting internal temperature data as stored in a register during a preceding driving cycle in response to a temperature data request signal when a temperature sensor of the semiconductor memory device is in an off state;

driving the temperature sensor to an on state during a predefined time section after the output of the internal temperature data is completed and in response to the temperature data request signal as applied in case of a non-data access mode;

driving the temperature sensor to the off state during a data access mode; and storing the internal temperature data as obtained from the temperature sensor in the register.

8. The method according to claim 7, wherein the temperature data request signal is an expansion mode register set (EMRS) command as provided in an external memory controller connected to the semiconductor memory device.

9. The method according to claim 7, wherein the temperature sensor is a semiconductor temperature sensor in a band gap reference type.

10. The method according to claim 7, wherein the predefined time section is below about 5 microseconds.

11. The method according to claim 7, wherein the internal temperature data is output by a data output buffer, the data output buffer being in an inactive state in a preceding data access operation mode.

* * * * *